(12) United States Patent
Murakami et al.

(10) Patent No.: US 7,539,739 B2
(45) Date of Patent: May 26, 2009

(54) SELF-CONFIGURING NETWORK SYSTEM AND ROUTERS FOR USE THEREIN

(75) Inventors: Takashi Murakami, Kyoto (JP); Yasuyuki Shintani, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 10/847,364

(22) Filed: May 18, 2004

(65) Prior Publication Data

US 2004/0236845 A1 Nov. 25, 2004

(30) Foreign Application Priority Data

May 21, 2003 (JP) ............................. 2003-142953

(51) Int. Cl.
  *G06F 15/177* (2006.01)
(52) U.S. Cl. ................... 709/220; 709/202; 709/221; 709/222; 709/223; 709/249; 709/251
(58) Field of Classification Search ............... 709/202, 709/220–223, 249, 251
See application file for complete search history.

(56) References Cited

U.S. PATENT DOCUMENTS

| | | | | |
|---|---|---|---|---|
| 5,367,665 A | * | 11/1994 | Koch et al. ................. | 714/11 |
| 5,907,678 A | * | 5/1999 | Housel et al. .............. | 709/213 |
| 5,909,569 A | * | 6/1999 | Housel et al. .............. | 703/21 |
| 6,061,714 A | * | 5/2000 | Housel et al. .............. | 709/203 |
| 6,374,316 B1 | * | 4/2002 | James et al. ................ | 710/104 |
| 6,453,343 B1 | * | 9/2002 | Housel et al. .............. | 709/213 |
| 6,470,384 B1 | * | 10/2002 | O'Brien et al. ............ | 709/223 |
| 6,621,798 B1 | * | 9/2003 | Krishnan et al. ........... | 370/256 |
| 6,738,819 B1 | * | 5/2004 | Li et al. .................... | 709/229 |
| 6,757,901 B1 | * | 6/2004 | McCloghrie et al. ...... | 719/318 |
| 6,836,463 B2 | * | 12/2004 | Garcia-Luna-Aceves et al. ........................ | 370/238 |
| 7,275,094 B1 | * | 9/2007 | McCloghrie et al. ...... | 709/223 |
| 2005/0102384 A1 | * | 5/2005 | Ueno et al. ................ | 709/223 |

FOREIGN PATENT DOCUMENTS

JP 3353009 9/2002

(Continued)

OTHER PUBLICATIONS

Echonet Specification Version: 2.11, Echonet Consortium, Apr. 26, 2002. (Japanese & English version).
William Stallings, entitled "*Handbook of Computer Communications Standards: vol. 2 Local Area Network Standards*", 1990, Howard, W. Sams & Company, USA, pp. 206-235, XP002294782.

*Primary Examiner*—Liangche A Wang
(74) *Attorney, Agent, or Firm*—Wenderoth, Lind & Ponack, L.L.P.

(57) ABSTRACT

A network system comprising routers and a plurality of sub-networks, each of which connects apparatuses, wherein the plurality of sub-networks are identified by respective Net IDs, and are connected via the routers to form a tree structure. Each of the routers includes: first and second communication interface units that connect multiple sub-networks; a router data storage unit that holds router data including the Net IDs of the respective sub-networks that are connected; and a control unit that performs a cold start, which is a start-up process involving an update of the router data stored in the router data storage unit, wherein the control unit, when performing the cold start, causes each of the routers connected to downstream sub-networks to perform a cold start.

25 Claims, 11 Drawing Sheets

FOREIGN PATENT DOCUMENTS

| | | |
|---|---|---|
| JP | 3353010 | 9/2002 |
| JP | 3373808 | 11/2002 |
| JP | 3394954 | 1/2003 |
| JP | 3394955 | 1/2003 |
| JP | 3394956 | 1/2003 |
| JP | 3394957 | 1/2003 |
| WO | 00/57263 | 9/2000 |
| WO | 03/067813 | 8/2003 |

* cited by examiner

FIG. 4

Cases that may be encountered at automatic setting router cold start

| CASE | Number of detected master routers | Communication with Net ID server | Process |
|---|---|---|---|
| 1 | 2 or more | — | Not started as router |
| 2 | 0 | — | Not started as router |
| 3 | 1 | Impossible | Not started as router |
| 4 | 1 | Possible | Started as router |

Note) The "—" mark indicates any situation

FIG. 7

Cases that may be encountered at manual setting router cold start

| CASE | Number of detected master routers | Communication with Net ID server | Net ID duplication | Process |
|---|---|---|---|---|
| 1 | 2 or more | — | — | Not started as router |
| 2 | 0 | — | — | Started as router |
| 3 | 1 | Impossible | — | Started as router |
| 4 | | Possible | Not duplicated | Started as router |
| 5 | | | Duplicated | Not started as router |

Note) The "—" mark indicates any situation

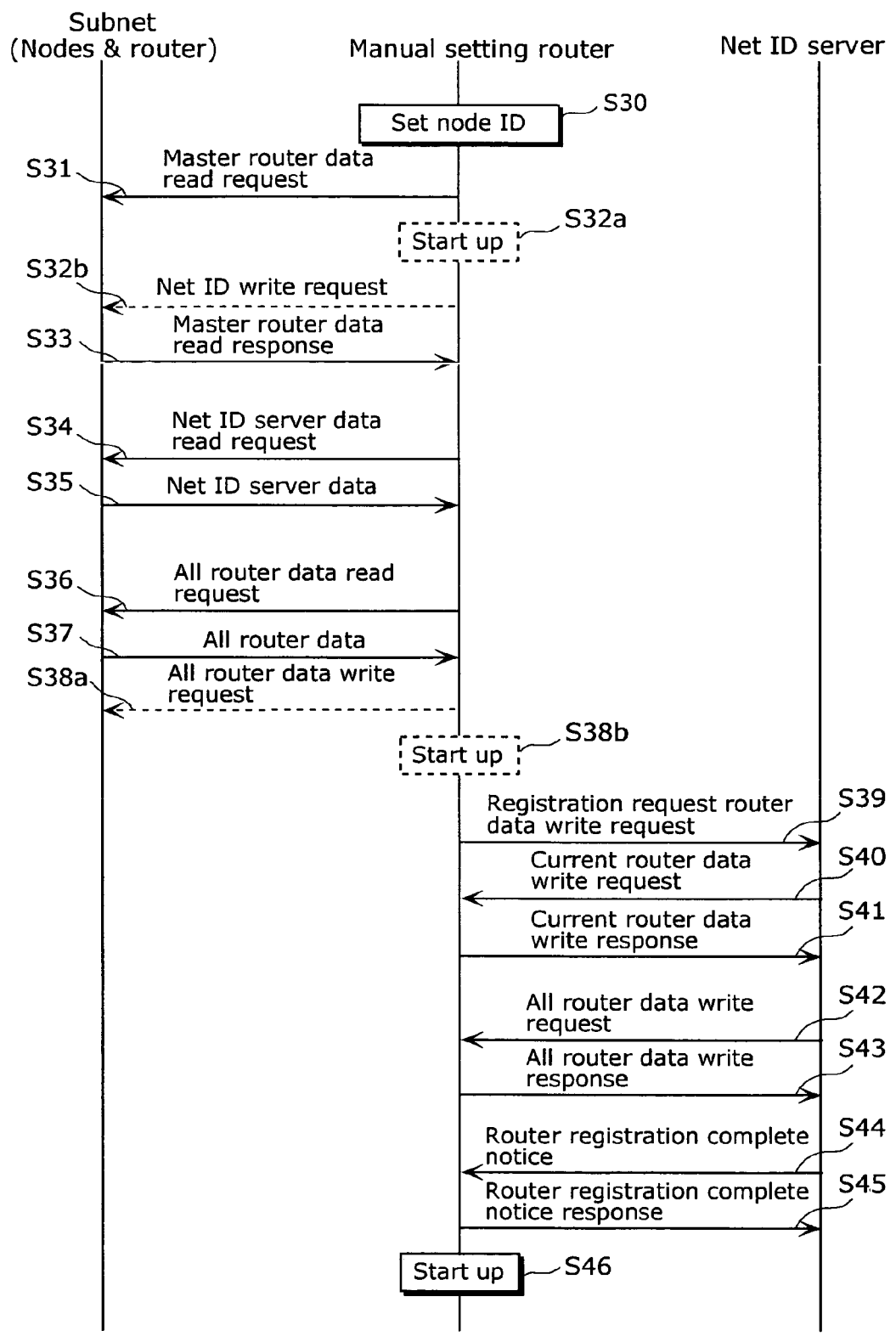

FIG. 10

Cases that may be encountered at router warm start

| CASE | Number of detected master routers | Connected subnet information | All router data from master router or Net ID server | Automatic setting router or Manual setting router | Process |
|---|---|---|---|---|---|
| 1 | 2 or more | — | — | — | (B) |
| 2 | 0 | Agree | — | Automatic setting router | (C) |
| 3 | | | | Manual setting router | (A) |
| 4 | | Disagree | — | — | (C) |
| 5 | 1 | Agree | Agree | — | (A) |
| 6 | | | Disagree | — | (C) |
| 7 | | Disagree | — | — | (C) |

Note) The "—" mark indicates any situation

Process (A): start up using information which has been retained since before warm start starts
Process (B): not start up as router
Process (C): move to cold start without starting up as router.

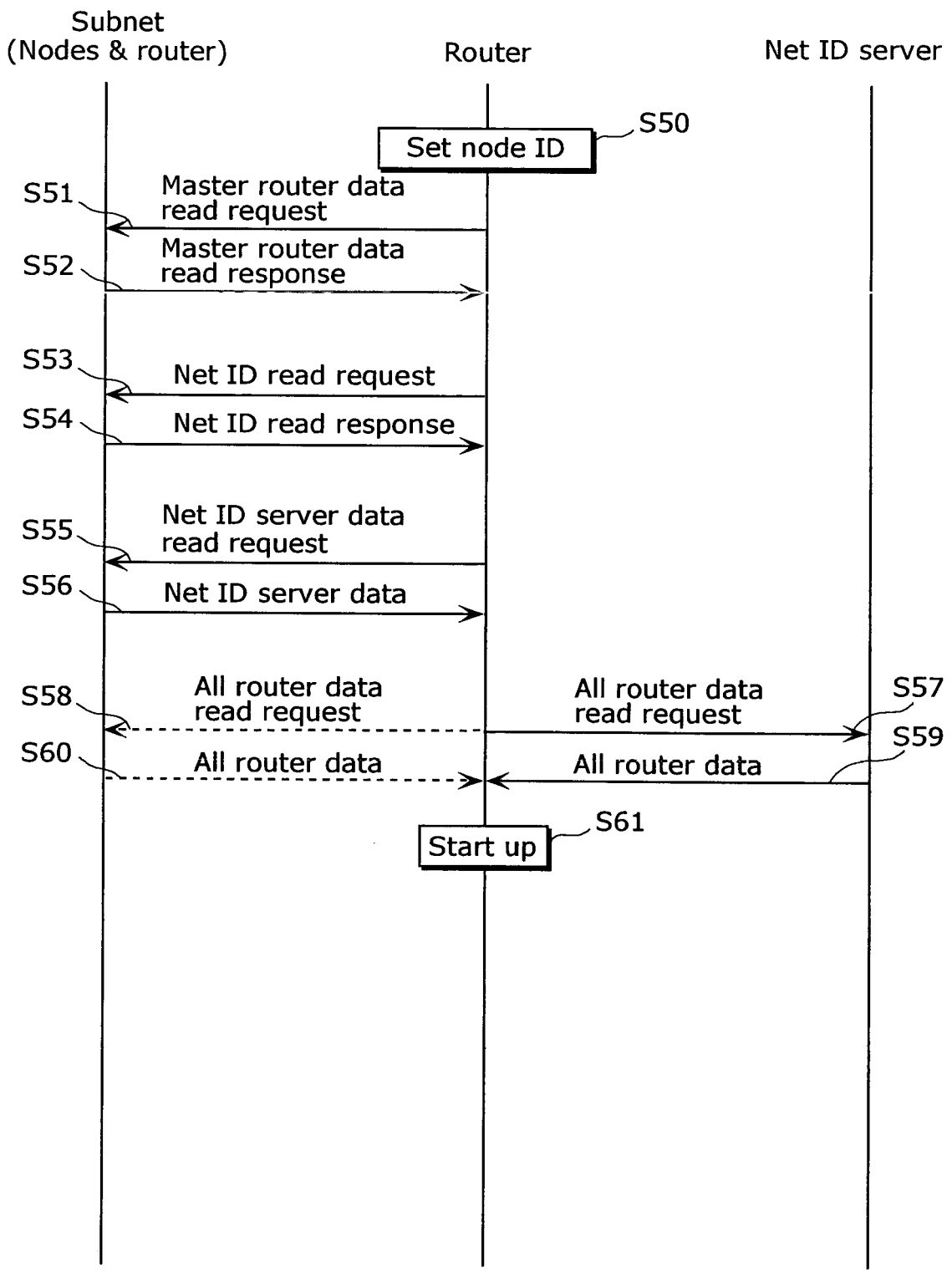

SELF-CONFIGURING NETWORK SYSTEM AND ROUTERS FOR USE THEREIN

BACKGROUND OF THE INVENTION (1) Field of the Invention

The present invention relates to a network system comprising a plurality of sub-networks, each of which connects apparatuses including a router device, and particularly to a technique for automatically building a network configuration in which no conflicts occur, at the time of starting up the router device that is connected to the sub-networks.

(2) Description of the Related Art

With the expansion in the use and scale of communication networks, there exist a variety of transmission media, and there have been developed a variety of router devices (hereinafter also referred to simply as "router(s)") for connecting sub-networks (to be also referred to simply as "subnet(s)") that use homogeneous or heterogeneous transmission media. Note that homogeneous transmission media are used within the same subnet. In order to connect multiple subnets using a router, it is required that identifiers for uniquely identifying these subnets (hereinafter referred to as "Net ID(s)") do to conflict with one another, i.e., values of Net IDs are required to be different. Note that "sub-network" is a smaller network unit that serves as one network system.

In order to meet this requirement, there is proposed a technique for verifying, at the time of starting up a router, that there is no conflict in the network configuration of a network system (hereinafter also referred to as "system") comprised of multiple subnets that are connected (e.g. "Router and start up method thereof" disclosed in Japanese Patent No. 3373808).

In the above existing technique, a router verifies whether there is a flaw or not in the network configuration by broadcasting, to all subnets it is connected to, a message requesting their Net IDs, and by checking the received responses to such a request.

In this existing technique, it is possible to start up the router without any problems when there is no change in the network configuration of the system, such as in the case where a router is simply replaced with another one. However, when starting up a new router in order to integrate different systems with such a router, it is impossible to automatically solve the problem within the integrated system of conflicts on the networks.

SUMMARY OF THE INVENTION

The present invention has been conceived in view of the above problem, and it is an object of the present invention to provide a useful network system which enables a network configuration in which no conflicts occur to be automatically built upon start-up of a router, with the user being unaware of it.

In order to achieve the above object, a network system according to the present invention is a network system comprising: at least one router device; and a plurality of sub-networks, each of which connects apparatuses; wherein said plurality of sub-networks are identified by respective Net IDs, and are connected via said at least one router device to form a tree structure; and each of said at least one router device includes: a communication unit operable to connect multiple ones of said plurality of sub-networks; a router data storage unit operable to hold router data that includes the respective Net IDs of the multiple ones of said plurality of sub-networks that are connected by said communication unit; and a cold start unit operable to perform a cold start that is a start-up process involving an update of the router data stored in said router data storage unit; wherein said cold start unit, when performing the cold start, causes each of said at least one router device connected to a downstream sub-network to perform a cold start. Accordingly, even when multiple different networks are integrated by a new router device, since the downstream apparatuses also start performing a cold start in reaction to the router device performing a cold start after such a router device is connected to the networks, the Net IDs of the downstream sub-networks in the system are initialized, making it possible to automatically build a new network system in which no conflicts occur.

Here, the above network system may further comprise a Net ID server operable to assign the Net IDs to said plurality of sub-networks, wherein said cold start unit is operable to perform a cold start by storing the Net IDs assigned by said Net ID server into said router data storage unit. Also, said cold start unit may be operable to cause each of said at least one router device connected to the downstream sub-network to perform a cold start by sending a Net ID write request to each of said at least one router device connected to the downstream sub-network, the Net ID write request being a request indicating that the Net IDs of the respective downstream sub-networks should be updated to the Net IDs assigned by said Net ID server. Accordingly, by causing an automatic-setting router whose Net ID is determined by the Net ID server to perform a cold start, unique Net IDs are assigned to the downstream sub-networks, making it possible for the network system to be automatically built.

Furthermore, the cold start unit may be operable to perform a cold start by storing pre-set Net IDs into said router data storage unit. Also, the cold start unit may be operable to cause each of said at least one router device connected to the downstream sub-network to perform a cold start by sending a Net ID write request to each of said at least one router device connected to the downstream sub-network, the Net ID write request being a request indicating that the Net IDs of the respective downstream sub-networks should be updated to the pre-set Net IDs. Accordingly, by causing a manual setting router whose Net ID is determined by the manually-set Net ID server to perform a cold start, unique Net IDs are assigned to the downstream sub-networks, making it possible for the network system to be automatically built.

Moreover, in the above network system, each of said at least one router device may further include an all-router data distribution unit operable to obtain all-router data, which is information made up of router data of each of said at least one router device connected to said network system, update the obtained all-router data based on the all-router data and the router data stored in said router data storage unit, and distribute the updated all-router data to each of said at least one router device connected to said network system. Accordingly, even when multiple systems are integrated by a new router device, it becomes possible for the all-router data to be automatically updated in response to the integration of the systems, since new all-router data added with new information that becomes necessary with the employment of such a new router device, is distributed to all router devices in the integrated system.

Furthermore, each of said at least one router device may further include a warm start unit operable to perform a warm start, which is a start-up process without involving an update of the router data stored in said router data storage unit. Also, all-router data may be stored in said router data storage unit in addition to the router data, the all-router data being information made up of router data of each of said at least one router device connected to said network system; and said warm start unit may be operable to perform a warm start when both of the following conditions are satisfied, for example: each information concerning the multiple ones of said plurality of sub-networks connected by said communication unit agrees with the router data stored in said router data storage unit; and each of the all-router data obtained via the multiple ones of said plurality of sub-networks connected by said communication unit agrees with the all-router data stored in said router data storage unit. Accordingly, it becomes possible for the router to start up again, reusing the initialization information, even in cases such as where such a router device is powered on again after the power is turned off.

Moreover, the warm start unit may be operable to perform a cold start without performing a warm start when one of the following conditions is satisfied: the information concerning the multiple ones of said plurality of sub-networks connected by said communication unit disagrees with the router data stored in said router data storage unit; and each of the all-router data obtained via the multiple ones of said plurality of sub-networks connected by said communication unit disagrees with the all-router data stored in said router data storage unit. Accordingly, since the router device automatically moves to a cold start when there is a possibility that some conflicts will occur when it performs a warm start, it becomes possible to avoid the router device from starting up in a state in which the network configuration still involves conflicts.

Note that not only is it possible for the present invention to be embodied as a network system with the above configuration, but also as a router device that constitutes the network system, a start-up method for the router device, and a program to be embedded into the router device. Also note that it is possible to download such program onto a router device, and the like, via a network.

As described above, according to the present invention, since the downstream router devices also perform a cold start when the upstream router device performs a cold start, even when there is an abnormality with the network configuration of a network system, it is possible for such an abnormality to be automatically repaired. Furthermore, even if there exists no Net ID server, since the manual setting router device updates the all-router data by incorporating its own data into such all-router data at the time of performing a cold start, and distributes the updated all-router data to all the router devices in the network system, it becomes possible for the network configuration to be automatically updated within the network system. Thus, the present invention is extremely useful in the present age when there exist a variety of communication networks.

As further information about the technical background to this application, Japanese Patent application No. 2003-142953 filed on May 21, 2003 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a table showing conditions for starting up an automatic-setting router at the time of a cold start;

FIG. 7 is a table showing conditions for starting up a manual-setting router at the time of a cold start;

FIG. 8 is a diagram showing a basic sequence to be performed when the manual-setting router is started by a cold start;

FIG. 10 is a table showing conditions for starting up the router at the time of a warm start; and FIG. 11 is a diagram showing a basic sequence to be performed when the router is started by a warm start.

DESCRIPTION OF THE PREFERRED EMBODIMENT

The following describes the preferred embodiment of the present invention with reference to the drawings.

Figure 1:
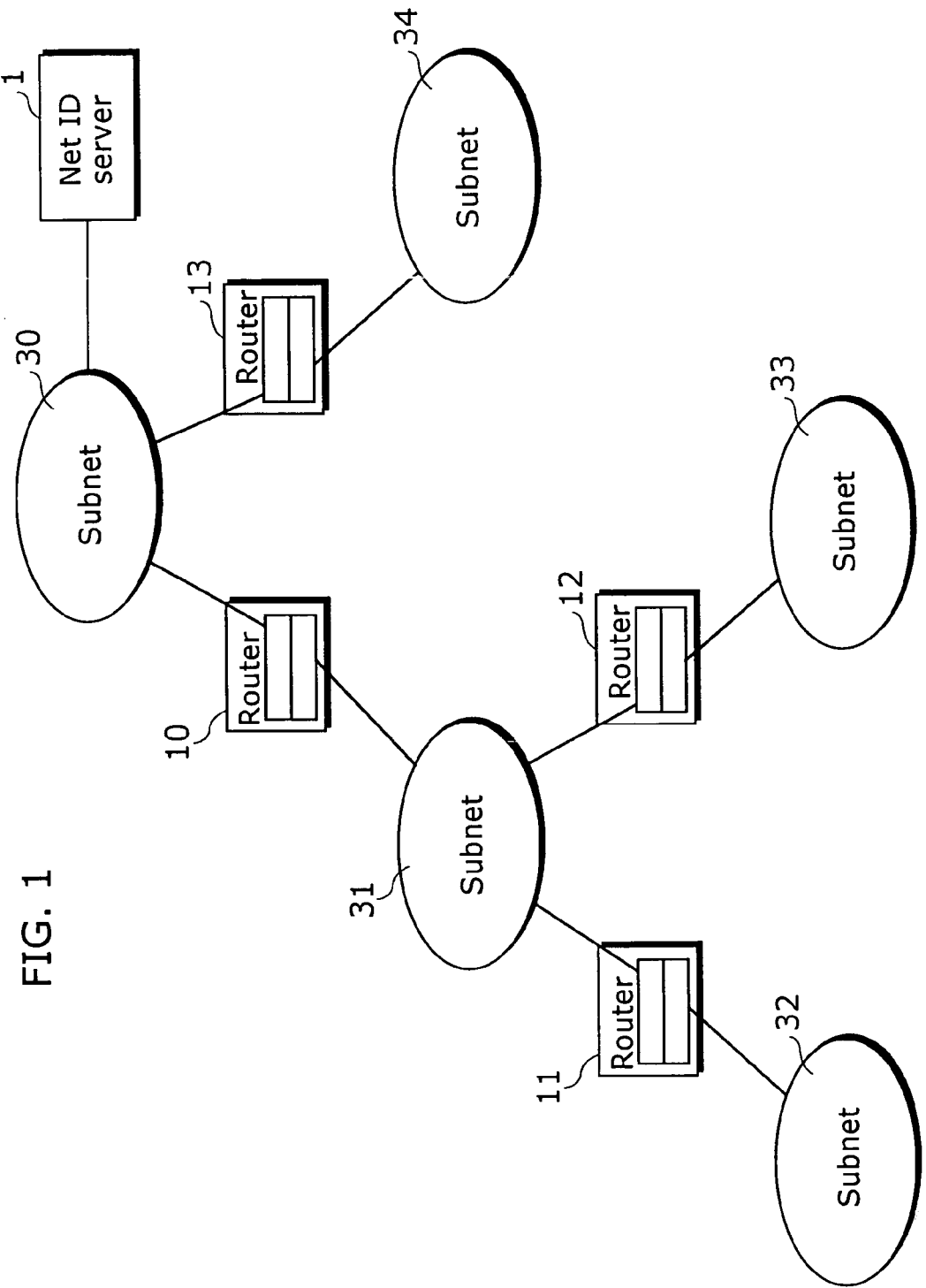
FIG. 1 is a diagram showing an example configuration of a network system according to an embodiment of the present invention.

FIG. 1 is a diagram showing an example configuration of a is network system according to the present embodiment. This network system is comprised of five subnets 30~34, four routers 10~13 that connect these subnets 30~34, a Net ID server 1, and the like. Note that, in actuality, a variety of communication terminal apparatuses known as nodes are connected to each of the subnets 30~34 which, however, are not illustrated in the drawing.

Each of the subnets 30~34, which is a home network or the like, is the smallest network unit to be identified by a Net ID. Nodes are home appliances and the like, each being equipped with a communication interface.

Each of the routers 10~13, which are devices for connecting two subnets whose transmission media are homogeneous or heterogeneous, routes communication packets, e.g., outputs a communication packet obtained from one subnet to the other subnet.

The Net ID server 1, also called a parent router, is a server device that determines the Net IDs of the respective subnets 30~34 by assigning a Net ID to each of the routers 10~13, and provides the routers 10~13 with all sorts of router data. Note that router data, which is information related to a router and all subnets connected via the router, comes in two types: router data related to such router (hereinafter also referred to as "current router data") and all router data related to all the routers connected to the network system.

Note that the following rules concerning the network configuration must be followed in this network system:

(1) the subnets 30~34 shall be connected via the routers 10~13 to form a tree structure (i.e. not a loop structure);

(2) no Net ID server or one Net ID server is connected in one network system, or in an integrated network system in the case where plural network systems are integrated together (a network and an integrated network system are hereinafter referred to also as "domain"). In the case where plural subnets exist and a Net ID server is connected in the system, such Net ID server shall be connected to the uppermost (root) subnet; and (3) when plural routers are connected to one subnet, there is one router located in the path to the Net ID server (i.e. the router in such a subnet to be first provided with router data from the Net ID server). Such router shall serve as the "master router" in the subnet, whereas the other routers shall serve as "slave routers".

Note that in the case where multiple routers are connected to one subnet, out of the multiple routers, a router located closest to the Net ID server shall be referred to as the "router located upstream/upstream router", whereas router(s) located far from the Net ID server shall be referred to as "router(s) located downstream/downstream router(s)". In the network system shown in FIG. 1, the routers 11 and 12 are routers located downstream in relation to the router 10, whereas the router 10 is the router located upstream in relation to the router 11.

Figure 2:
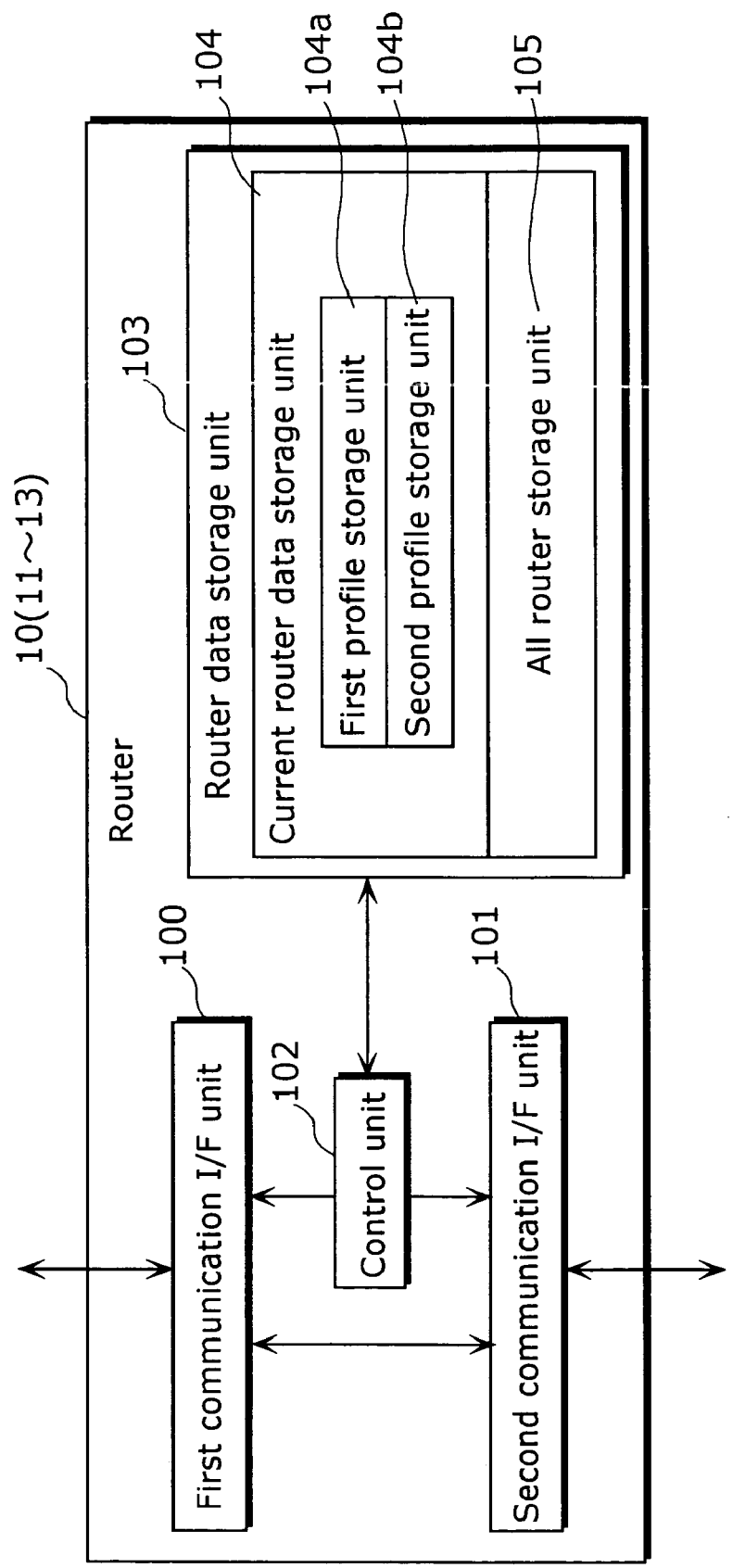
FIG. 2 is a functional block diagram showing a configuration of a router.

FIG. 2 is a functional block diagram showing the configuration of the router 10 (11~13). The router 10 is equipped with a first communication I/F unit 100, a second communication I/F unit 101, a control unit 102, and a router data storage unit 103.

The first communication I/F unit 100 and the second communication I/F unit 101, both of which are communication interfaces that connect the router 10 with subnets, perform routing under the control of the communication unit 10, such as obtaining a communication packet carried on a subnet and passing it to the other communication I/F unit.

The control unit 102 is a CPU, or the like, that controls start-up processing to be described below, as well as the first communication I/F unit 100 and the second communication I/F unit 101, according to router data stored in the router data storage unit 103.

The router data storage unit 103, which is a memory, or the is like, for storing information relating to all the other routers and the Net ID server in the domain, is made up of a current router data storage unit 104 for storing current router data and an all-router data storage unit 105 for storing all-router data.

Figure 3:
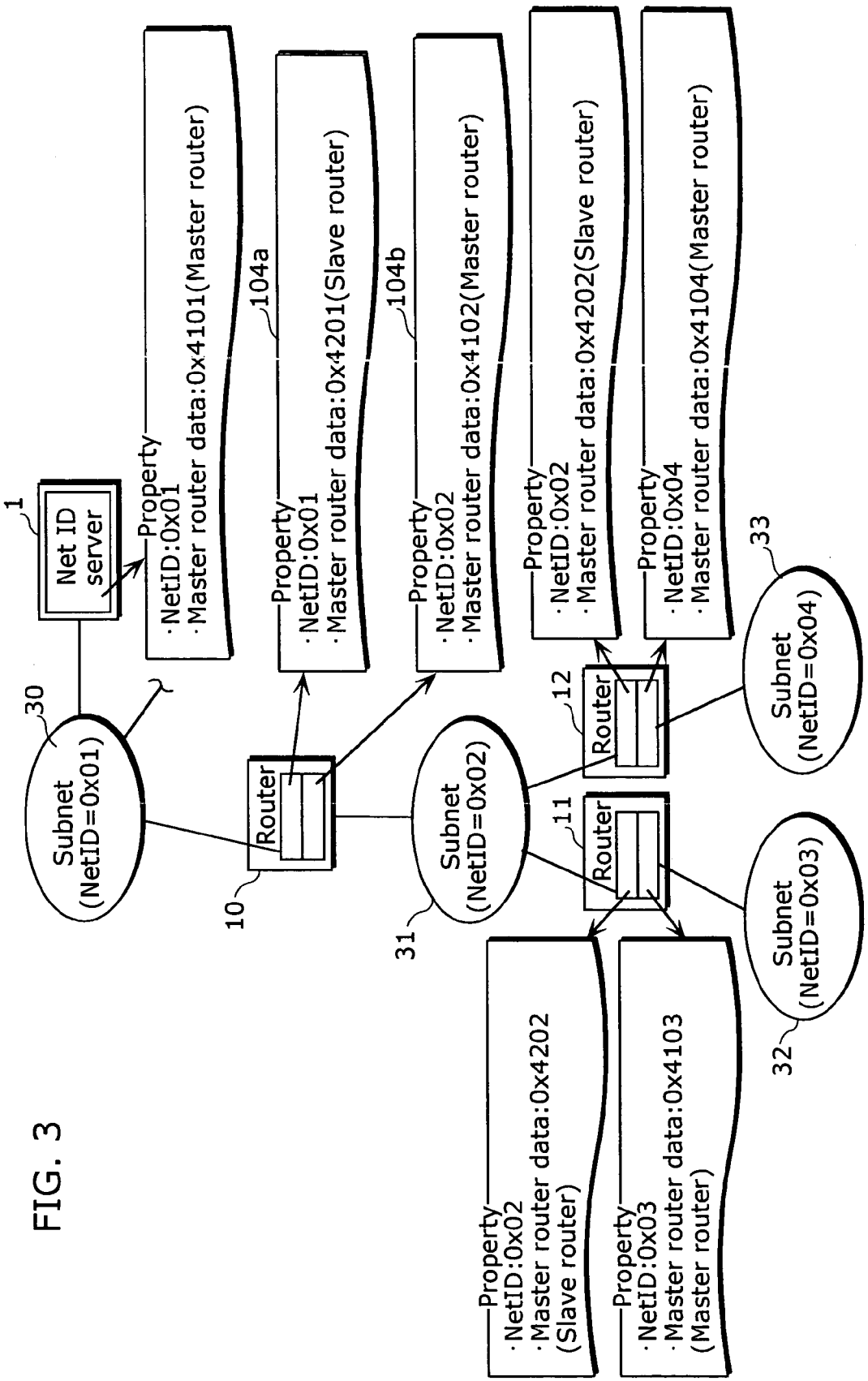
FIG. 3 is a diagram showing example properties stored in the router.

The current router data storage unit 104 has a first property storage unit 104a for storing the property of a subnet that is connected to the first communication I/F unit 100, and a second property storage unit 104b for storing the property of a subnet that is connected to the second communication I/F unit 101. Properties to be stored in the first property storage unit 104a and the second property storage unit 104b include, as shown in FIG. 3, the Net IDs of the corresponding subnets and master router data (information indicating whether each router is a "master router" or a "slave router") in the respective subnets. For example, in FIG. 3, regarding the subnet A, the first property storage unit 104a of the router 10 that connects a subnet A (Net ID=0x01) and a subnet B (Net ID=0x02), stores "0x01" as a Net ID and "0x4201" indicating that the router is a slave router as master router data, whereas, regarding the subnet B, the second property storage unit 104b stores "0x02" as a Net ID and "0x4102" indicating that the router is a master router as master router data. Note that the current router data storage unit 104 also has an area for storing the node ID (an identifier for uniquely identifying each node in the domain) of the router 10. "0x" is a symbol to indicate that numeric values that follow are hexadecimal digits. Note that in the present embodiment, a router connects two subnets, but a router may also connect three or more subnets.

The all-router data storage unit 105 stores all-router data, i.e., information to be generated by putting together the current router data of all the other routers existing in the domain.

Next, a description is given of start-up processing of the routers 10~13 in a network system with the above configuration.

First, a cold start of the routers 10~13 is described.

In each subnet to be connected, each of the routers 10~13 performs start-up processing that is different from one performed by a general apparatus. Types of start-up processing include: cold start in which initialization is performed with initialization information (e.g. the above-described properties) being discarded; and warm start in which initialization is started with initialization information which was obtained at the time of the previous connection being preserved.

Each of the routers 10~13 performs a cold start in the following cases: (1) the router newly participates in the network system; (2) the router fails to perform a warm start; and (3) the router receives a "Net ID write request" (request for updating a Net ID) related to the subnets to which such router is connected.

Furthermore, from a functional point of view, the routers 10~13 are categorized into two types, automatic-setting router and manual-setting router, for which different procedures are taken in a cold start. Here, an automatic-setting router is a router that automatically obtains a Net ID from the Net ID server 1, whereas a manual-setting router is a router that requires a user to manually set a Net ID or a router that holds a Net ID as a fixed value. Each of the routers 10~13 holds, in the router data storage unit 103, whether it is an automatic-setting router or a manual-setting router. Note that it is possible to switch between automatic-setting router and manual-setting router by inputting either automatic-setting or manual-setting using a hardware switch or data entry screen, if there is one.

First, a description is given of a cold start of the routers 10~13 in the case where each of the routers 10~13 is an automatic-setting router (each of the routers 10~13 is hereinafter referred to simply as an "automatic-setting router").

FIG. 4 is a table showing conditions for starting up the automatic-setting router by a cold start. The table shows whether the automatic-setting router is to be started as a router or not for each combination of the following items (CASE 1~4): the number of master routers detected in the connected subnets ("Number of detected master routers"); and whether or not the automatic-setting router can communicate with the Net ID server 1 ("Communication with Net ID server").

As shown in FIG. 4, the automatic-setting router will not start as a router in the event of abnormal circumstances, i.e., (1) no master router is detected, or two or more master routers are detected and (2) current router data and all-router data cannot be obtained from the Net ID server. Stated another way, the automatic-setting router starts as a router only in the case where only one master router is detected and where the automatic setting router can communicate with the Net ID server.

Figure 5:
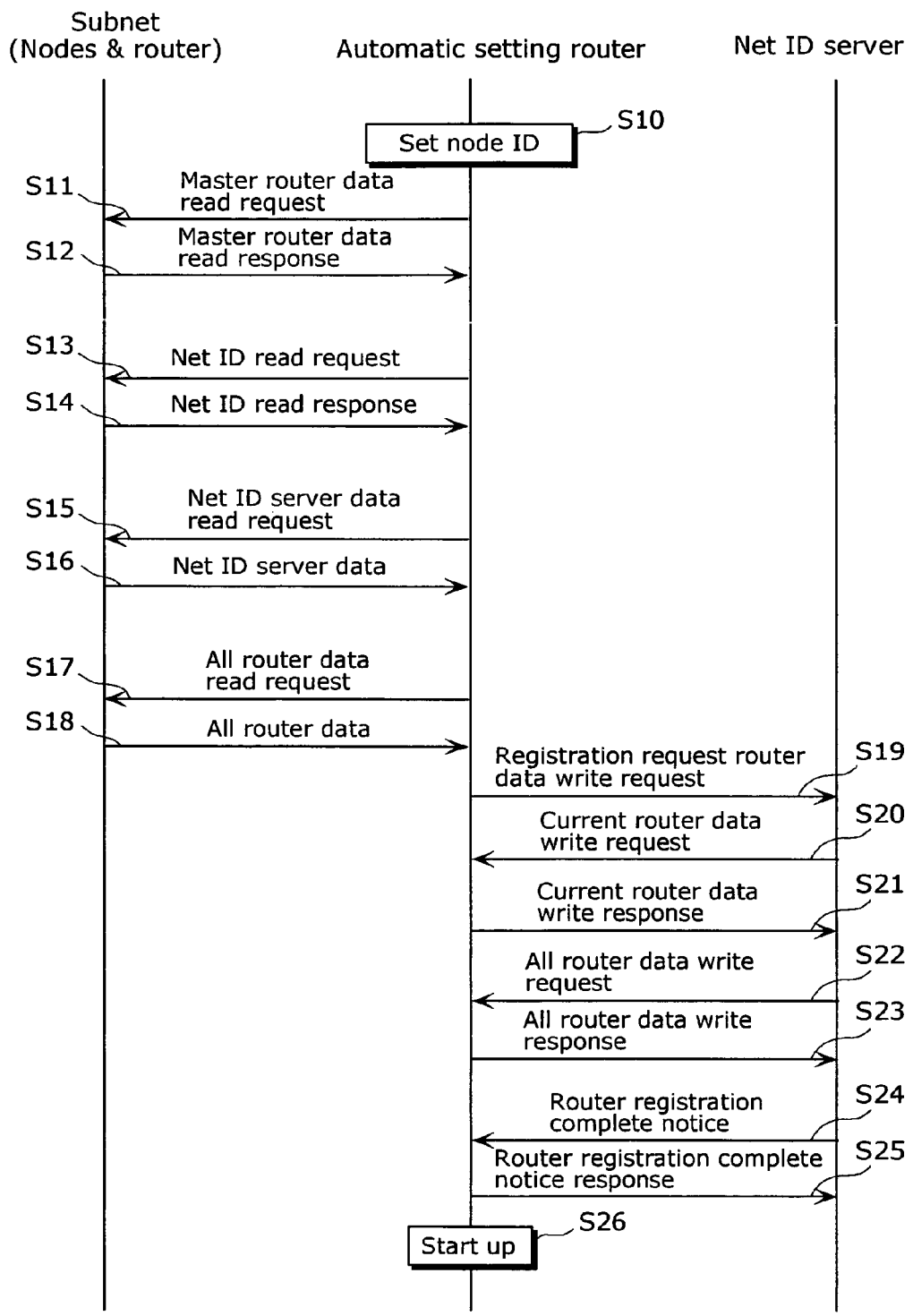
FIG. 5 is a diagram showing a basic sequence to be performed when the automatic-setting router is started by a cold start.

FIG. 5 is a diagram showing a basic sequence to be performed when the automatic-setting router is started by a cold start.

First, the automatic-setting router completes the setting of its own node ID (stores its own node ID into the current router data storage unit 104) by performing internal initial processing (S10). Next, in order to specify the number of master routers, the automatic-setting router broadcasts, to each of all the subnets to which it is connected, a "master router data read request" (request for asking the routers to provide maser router data) (S11). Then, the automatic-setting router obtains master router data by receiving "master router data read responses" (responses to the "master router data read request") (S12). As a result, when the number of detected mater routers is zero, or two or more, the automatic-setting router will not start up as a router. In this case, the automatic-setting router starts up as a normal node, and will not carry out the subsequent steps in the sequence.

Then, in order to obtain the current Net IDs of the subnets to is which it is connected, the automatic-setting router broadcasts, to each of the subnets to which it is connected, a "Net ID read request" (request for asking nodes to inform the automatic-setting router of their Net IDs) addressed to node profiles (nodes connected to the respective subnets) (S13). Here, the automatic-setting router also performs processing in the case where it has received direct message data from another node that possesses a Net ID different from its own Net ID. In other words, the automatic setting router holds a Net ID included in a received "Net ID read response" (response to the "Net ID read request") as a tentative Net ID (S14).

Next, in order to specify the number of Net ID servers and information including the addresses of the respective Net ID servers, the automatic-setting router broadcasts, to the subnet where a master router exists, a "Net ID server data read request" (request for asking Net ID servers to provide information such as properties) (S15). Then, the automatic-setting router obtains Net ID server data (S16). As a result, when the number of detected Net ID servers is zero, or two or more, the automatic-setting router will not start up as a router. In this case, the automatic-setting router starts up as a normal node, and will not perform the subsequent steps in the sequence.

Subsequently, the automatic-setting router sends, to each of the subnets to which it is connected, an "all-router data read request" (request for asking the routers to provide all-router data) addressed to router profiles (S17), so as to obtain all-router data from the routers existing in all the subnets to which the automatic-setting router executing a cold start is connected (S18).

After obtaining all-router data, the automatic-setting router sends, to the Net ID server 1, a "registration request router data write request" (request for asking the Net ID server to newly register router data) (S19). Note that in EA information (EA is an address formed of an address determined by an address that is realizes the layer-2 communication in a transmission medium and an address for identifying a subnet) to be used at the time of transmitting the "registration request router data write request", the Net IDs of slave routers shall be values obtained from the node profiles existing in the subnets to which the automatic-setting router is connected, and the Net ID of the master router shall be 0x00. If the automatic-setting router cannot receive a "current router data write request" (request for updating the current router data as required) from the Net ID server 1 within a fixed time period after sending the "registration request router data write request", the automatic-setting router resends this "registration request router data write request". Note that in the case where another router is in the middle of making a registration to the Net ID server, the automatic-setting router receives, from the Net ID server, a router registration state notice (router registration busy state 0x30). In this case, the automatic-setting router resends the "registration request router data write request" after a fixed time period.

If the automatic-setting router receives a "current router data write request" from the Net ID server 1 (S20), the automatic-setting router sends a "current router data write response" (notice indicating that the current router data has been updated) to the Net ID server 1 (S21). If the automatic-setting router cannot receive an "all-router data write request" (request for updating the all-router data as required) from the Net ID server 1 within a fixed time period after sending the "current router data write response", the automatic-setting router resends the "registration request router data write request".

If the automatic-setting router receives an "all-router data write request" from the Net ID server 1 (S22), the automatic-setting router sends an "all-router data write response" (notice indicating that the all-router data has been updated) to the Net ID server 1 (S23). If the automatic-setting router cannot receive a "router registration complete notice" (notice indicating that the Net ID server has updated the router data) from the Net ID server 1 within a fixed time period after sending the "all-router data write response", the automatic-setting router resends the "registration request router data write request".

If the automatic-setting router receives a "router registration complete notice" from the Net ID server 1 (S24), the automatic-setting router sends, to the Net ID server 1, a "router registration complete notice response" (notice indicating that the "router registration complete notice" has been received) (S25). The automatic-setting router begins starting up as a router upon sending such "router registration complete notice response" to the Net ID server 1 (S26).

Note that, regarding the case where all pieces of the obtained all-router data that are obtained from the other routers connected to the subnets to which the automatic-setting router is connected, are all the same, the automatic-setting router, when the Net ID included in the "current router data write request" received from the Net ID server 1 and the Net ID included in the "Net ID read responses" received from the node profiles existing in one of the subnets to which the automatic-setting router is connected are different, broadcasts a "Net ID write request" addressed to node profiles existing in the other subnet with a different Net ID, by use of the Net ID obtained when receiving the "current router data write request" from the Net ID server 1. Meanwhile, regarding the case where all pieces of the obtained all-router data that are obtained from the other routers connected to the subnets to which the automatic-setting router is connected, are not the same, the automatic-setting router broadcasts a "Net ID write request" to the subnet to which it is connected and in which no master router exists, by use of the Net ID obtained when receiving the "current router data write request" from the Net ID server 1.

The above sending of the "Net ID write request" is effective when integrating two different network systems. A system functions by itself without a Net ID server if all routers are manual-setting routers. However, when a Net ID server exists only in one of the network systems, it is possible to readily integrate two network systems by performing a cold start of the automatic setting router.

Figure 6:
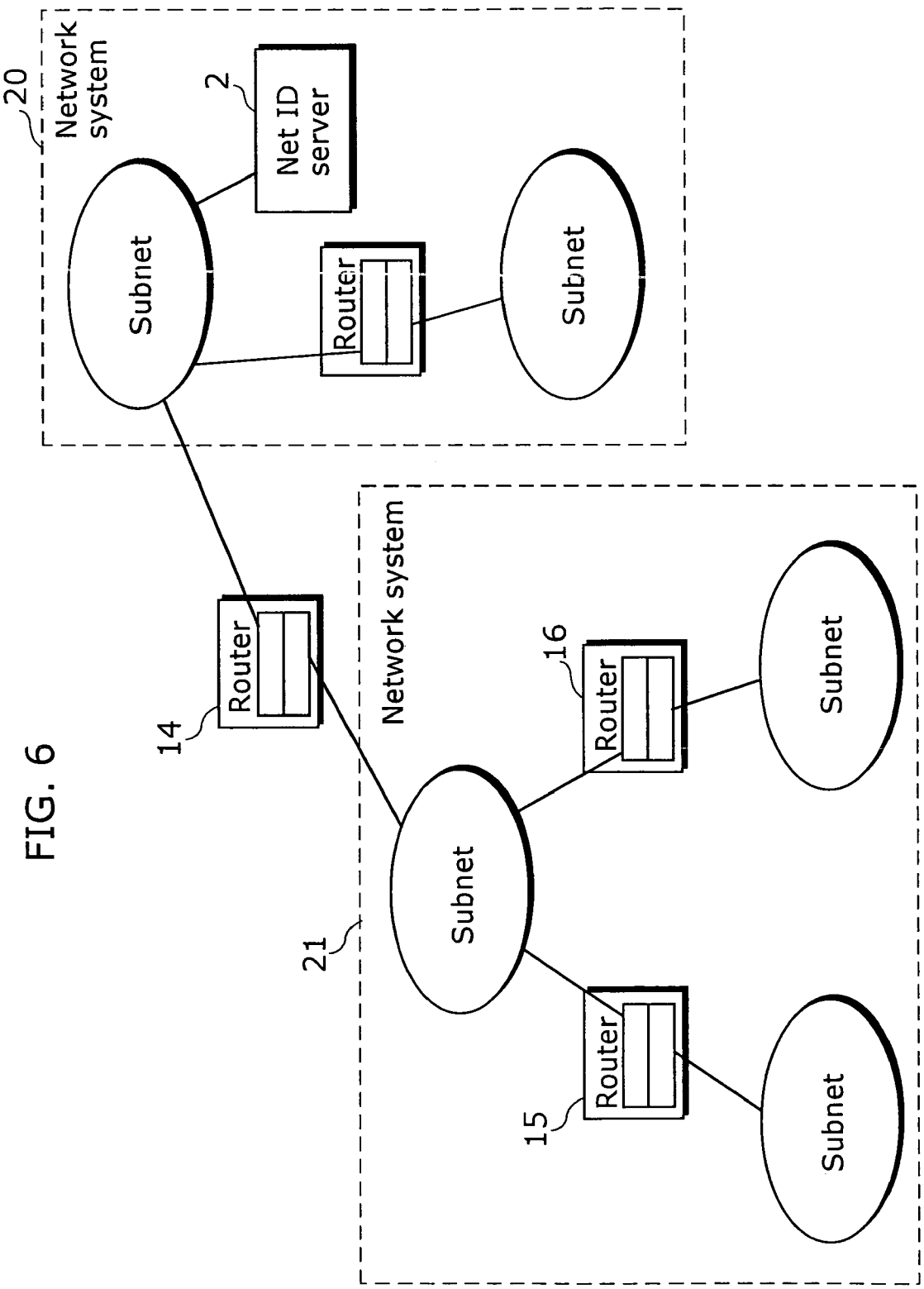
FIG. 6 is a diagram showing an example case where two network systems are integrated by an automatic-setting router.

FIG. 6 is a diagram showing an example case where two network systems are integrated by an automatic-setting router. This drawing illustrates an example in which a network system 20 and a network system 21 are integrated by the automatic-setting router 14. A Net ID server 2 exists in the network system 20, whereas no Net ID server exists in the network system 21. Stated another way, the routers 15 and 16 connected to the network system 21 in which no Net ID server exists, are located downstream in relation to the router 14 that performs start-up processing.

When the upstream router 14 performs a cold start, the downstream routers 15 and 16 become subject to the writing of Net IDs (receive the "Net ID write request"), as described above, and start performing a cold start. In other words, when the upstream router 14 performs a colds start, the downstream routers 15 and 16 shall always perform a cold start. By cold starts being performed in sequence as above, it becomes possible for Net IDs to be automatically assigned in a manner in which each Net ID of a subnet becomes unique, even after network systems are integrated.

Next, a description is given of a cold start of the routers 10~13 in the case where each of the routers 10~13 is a manual-setting router (each of the routers 10~13 is hereinafter referred to simply as a "manual-setting router").

FIG. 7 is a table showing conditions for starting up the manual-setting router by a cold start. The table shows whether the automatic-setting router is to be started as a router or not for each combination of the following items (CASE 1~5): the number of master routers detected in the subnets to which the manual-setting router is connected ("Number of detected master routers"); whether or not the manual-setting router can communicate with the Net ID server ("Communication with Net ID server"); and whether a Net ID to be manually set is already used in the domain or not ("Net ID duplication").

As shown in FIG. 7, the manual-setting router does not start as a router in the event of abnormal circumstances, i.e., (1) two or more master routers are detected, and (2) Net IDs to be set are already used in the domain (there is Net ID duplication). Stated another way, the manual-setting router starts as a router in the case where (1) no master router is detected, (2) only one master router is detected, but the manual-setting router cannot communicate with the Net ID server, or (3) only one master router is detected and the manual-setting router succeeded in communicating with the Net ID server, but Net IDs to be set are not used in the domain. Note that the reason that the manual-setting router starts as a router even if no master router is detected and the manual-setting router cannot communicate with the Net ID server, unlike the automatic-setting router, is due to consideration of the case where a simple network system is built such as one in which two subnets are connected by a single manual-setting router. In other words, since the manual-setting router pre-stores Net IDs to be set, it shall perform a cold start even if the manual-setting router cannot communicate with the Net ID server, as long as it is ensured that there is no duplication of Net IDs in the domain.

FIG. 8 is a diagram showing a basic sequence to be performed when the manual-setting router is started by a cold start. Note that the manual-setting router shall start performing the below sequence in the state in which Net IDs to be set are stored in advance in the is first property storage unit 104*a* and the second property storage unit 104*b*, and the like.

First, the manual-setting router completes the setting of its own node ID (stores its own node ID into the current router data storage unit 104) by performing internal initial processing (S30). Then, in order to specify the number of master routers, the manual-setting router broadcasts, to each of all the subnets to which it is connected, a "master router data read request" addressed to router profiles (S31). Then, the manual-setting router obtains master router data by receiving "master router data read responses" (S33). As a result, when the number of detected master routers is two or more, the manual-setting router will not start up as a router. In this case, the manual-setting router starts up as a normal node, and will not carry out the subsequent steps in the sequence.

Moreover, when a Net ID included in the received master router data and a Net ID retained by the manual-setting router are different, the manual-setting router will not start as a router. Stated another way, the manual-setting router will start up as a normal node without performing the subsequent steps in the sequence, and displays an abnormality indicating that these two Net IDs are different and therefore it is impossible to establish a system. Moreover, the manual-setting router provides a notice by broadcasting, to the domain, the details of such abnormality as an occurrence of abnormality.

Note that when receiving no "master router data read response" (when no router exists in the connected subnets), the manual-setting router begins starting up as a router (S32*a*), and broadcasts a "Net ID write request" addressed to node profiles in all the subnets to which it is connected (S32*b*).

When there is one master router according to the obtained master router data, the manual setting router, in order to specify the number of Net ID servers, the presence/absence of Net ID servers, and information including the addresses of the respective Net ID servers, broadcasts a "Net ID server data read request" to the subnet where the master router exists (S34). Then, the manual-setting router obtains Net ID server data (S35). As a result, when the number of detected Net ID servers is two or more, the manual-setting router will not start up as a router. In this case, the manual-setting router starts up as a normal node, and will not carry out the subsequent steps in the sequence. In this case, the manual-setting router displays an abnormality indicating that two or more Net ID servers have been detected, and broadcasts, to all the nodes in the domain, the details of such abnormality as an occurrence of abnormality.

Subsequently, the manual setting router sends, to each of all the subnets to which it is connected, an "all-router data read request" addressed to router profiles (S36), so as to obtain all-router data from the routers existing in all the subnets to which the manual-setting router executing a cold start is connected (S37).

In the subsequent steps, different processes are performed depending on whether there exists a Net ID server or not.

When there exists no Net ID server, and when the Net IDs which have been set are not the same as those of other subnets, the manual-setting router updates the all-router data based on its own EA and the obtained all-router data, and sends an "all-router data write request" to all the routers existing in the domain (S38*a*). After sending such request, the manual-setting router begins starting up as a router (S38*b*).

Meanwhile, when there exists a Net ID server 1, the manual-setting router obtains the all-router data (S37), and then sends a "registration request router data write request" to the Net ID server 1 (S39). Note that in EA information to be used at the time of sending this "registration request router data write request", both the Net IDs of slave routers and the Net ID of the master router shall be manually-set values. Note that in the case where another router is in the middle of making a registration to the Net ID server, the manual-setting router receives, from the Net ID server, a router registration state notice (router registration busy state 0x30). In this case, the manual-setting router resends the "registration request router data write request" after a fixed time period.

If the manual-setting router cannot receive a "current router data write request" from the Net ID server 1 within a fixed time period after sending the "registration request router data write request", the manual-setting router resends this "registration request router data write request". If the manual-setting router receives a "current router data write request" from the Net ID server 1 (S40), the manual-setting router sends a "current router data write response" to the Net ID server 1 (S41). Furthermore, if different Net IDs are written although it is confirmed that the values that were written in response to the "current router data write request" are the same as those of the manually-set Net IDs, the manual-setting router starts up not as a router but as a normal node, and will not carry out the subsequent steps in the sequence.

If the manual-setting router cannot receive an "all-router data write request" from the Net ID server 1 within a fixed time period after sending the "current router data write response", the manual-setting router resends the "registration request router data write request". If the manual-setting router receives an "all-router data write request" from the Net ID server 1 (S42), the manual-setting router sends an "all router data write response" to the Net ID server 1 (S43). If the manual-setting router cannot receive a "router registration complete notice" from the Net ID server 1 within a fixed time period after sending the "all-router data write response", the manual-setting router resends the "registration request router data write request". If the manual-setting router receives a "router registration complete notice" from the Net ID server 1 (S44), the manual-setting router sends a "router registration complete notice response" to the Net ID server 1 (S45). The manual-setting router begins starting up as a router upon sending such "router registration complete notice response" to the Net ID server 1 (S46).

Note that when all pieces of the all-router data obtained in Step S37 are not the same, the manual-setting router broadcasts a "Net ID write request" to the subnet to which the manual-setting router is connected and in which no master router exists, by use of the manually-set Net ID. This makes it possible to connect network systems that are not connected to a Net ID server.

Figure 9:
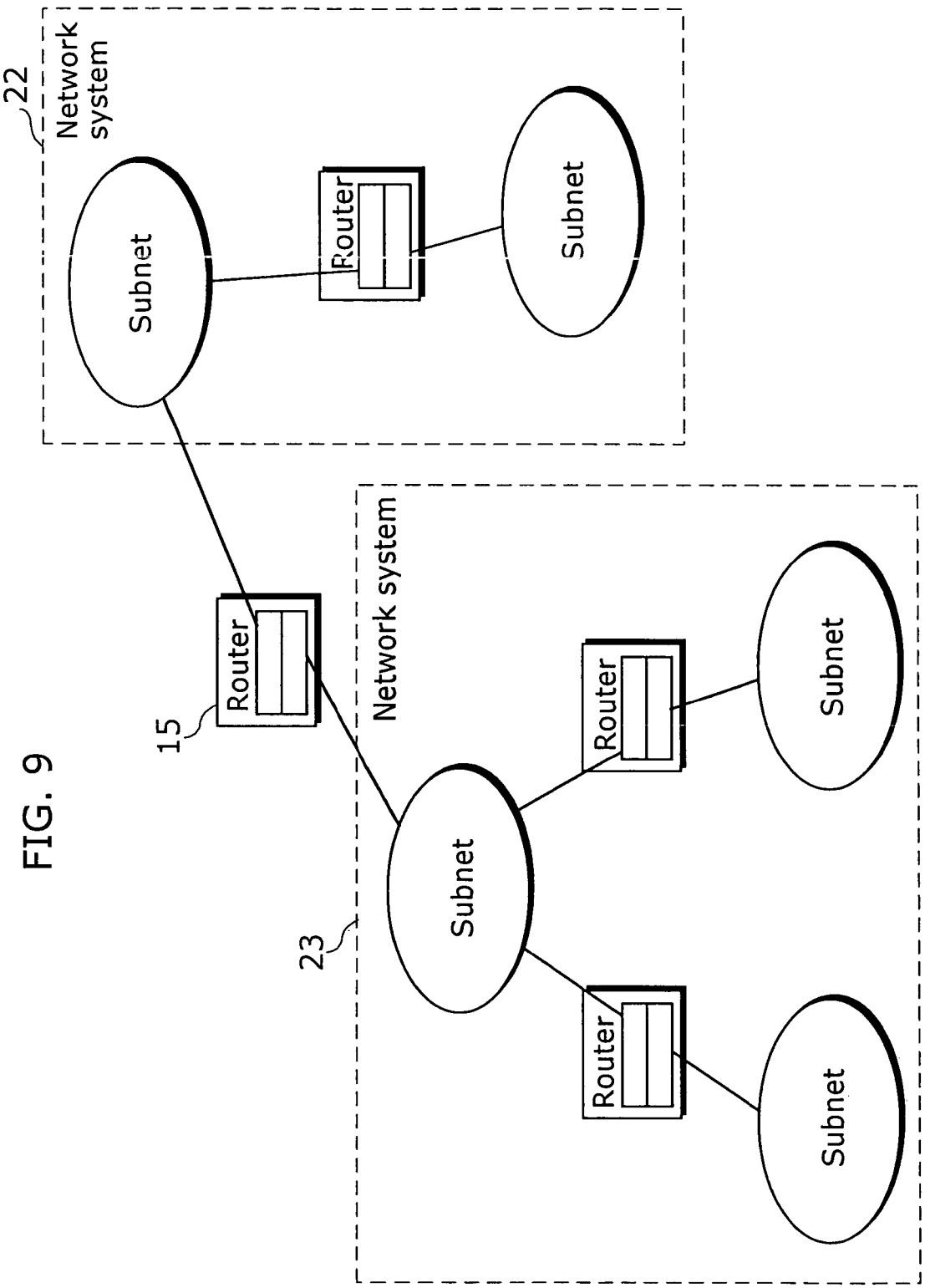
FIG. 9 is a diagram showing an example case where network systems that are not connected to a Net ID server are integrated by the manual-setting router.

FIG. 9 is a diagram showing an example case where two network systems that are not connected to a Net ID server are integrated by the manual-setting router. This drawing illustrates an example in which a network system 22 and a network system 23 having no Net ID server, are integrated by the manual-setting router 15.

The router 15 that has performed cold-start processing obtains all-router data from both of the network systems which are integrated, and updates the all-router data by adding its own all-router data to such obtained all-router data. Then, the router 15 distributes such updated all-router data to all the routers existing in the integrated network system. Accordingly, the contents of all pieces of all-router data possessed by all the routers connected to these two network systems become the same.

Finally, a description is given below of the case where each of the routers 10~13 (here the router 10 serves as a representative) performs a warm start.

As a precondition for performing a warm start, the router 10 is required to have participated in the network at least once after performing a cold start. Note that, while performing a warm start, the router 10 may either perform or not perform routing based on the information which it possessed last time it was started.

FIG. 10 is a table showing conditions for starting up the router by a warm start. The table shows which one of the processes (A)~(C) to be adopted in starting up (or not starting up) the router for each combination of the following items (CASE 1~7): the number of master routers detected in the subnets to which the router 10 is connected ("Number of detected master routers"); whether the configuration of the connected subnets is the same as the last time it was started ("Connected subnet information"); whether all router data obtained from the master router or the Net ID server is the same as the last time it was started ("All-router data from master router or Net ID server"); and whether the router to be started by a warm start is an automatic-setting router or a manual-setting router ("Automatic-setting router or manual-setting router"). Note that Process (A) is a method in which the router starts up using information which it has retained from before this warm start begins, Process (B) is a method in which the router does not start up as a router, and Process (C) is a method in which the router moves to a cold start without starting up as a router.

As shown in FIG. 10, the router does not start up as a router in the event of abnormal circumstances, i.e., (1) two or more master routers are detected in the subnets to which the router to perform a warm start is connected, (2) no master router is detected in the subnets to which the router to perform a warm start is connected and the router is an automatic-setting router, (3) the configuration of the subnets to which the router to perform a warm start is connected, is different from the last time it was started, and (4) all-router data to be obtained by the router to perform a warm start is different from the last time it was started. Stated another way, the router starts as a router in the case where (1) no master router is detected, the configuration of the subnets is the same as the last time it was started, and the router is a manual-setting router, or (2) only one master router is detected, the configuration of the subnets is the same as the last time it was started, and the all-router data is the same as the last time it was started.

FIG. 11 is a diagram showing a basic sequence to be performed when the router 10 is started by a warm start.

First, the router 10 completes the setting of its own node ID (stores its own node ID into the current router data storage unit 104) by performing internal initial processing (S50). Then, in order to specify the number of master routers, the router 10 broadcasts, to each of all the subnets to which it is connected, a "master router data read request" addressed to router profiles (S51). Then, the router 10 obtains master router data by receiving "master router data read responses" (S52). As a result, when the number of detected mater routers is two or more, the router 10 will not start up as a router. In this case, the router 10 starts up as a normal node, and will not carry out the subsequent steps in the sequence.

Meanwhile, when the number of master routers is zero or one according to the obtained master router data, the router 10, in order to obtain the current Net IDs of the connected subnets, broadcasts a "Net ID read request" to the subnets to which it is connected (S53). Then, the router 10 obtains the Net IDs (S54), and compares the current configuration of the subnets with the one last time the router 10 was started, by comparing the values of the obtained Net IDs with the values stored in the current router data storage unit 104. When, as a result of the comparison, such values are different, the router 10 moves to a cold start. Meanwhile, when the number of detected master routers is zero and the configuration of the subnets is the same as the last time the router 10 was started, the router 10 starts up as a router under the conditions under which the router 10 was started last time.

Meanwhile, when only one master router is detected, the router 10, in order to specify the number of Net ID servers, broadcasts a "Net ID server data read request" to the subnet where a master router exists (S55). Then, the router 10 receives Net ID server data (S56), and compares such received Net ID server data with the Net ID server data that was used last time the router 10 was started, with reference to the router data storage unit 103. When, as a result of the comparison, these pieces of data are different from each other, the router 10 moves to a cold start.

Subsequently, when there exists a Net ID server; the router 10 sends an "all-router data read request" to the Net ID server 1 individually (S57), whereas when the Net ID server 1 does not exist, the router 10 broadcast, to the subnet, an "all-router data read request" addressed to the master router (S58). Then, the router 10 obtains all-router data (S59 and S60), and compares such obtained all-router data with the all-router data stored in the all-router data storage unit 105. When, as a result of the comparison, the obtained all-router data is different from the all-router data that was used last time the router 10 was started, the router 10 moves to a cold start. Furthermore, the router 10 also moves to a cold start when such obtained all-router data does not include the EA of the router 10. Meanwhile, when the obtained all-router data is the same as the all-router data that was used last time the router 10 was started, and includes the EA of the router 10, the router 10 begins starting up as a router (S61).

As described above, the router 10 is started by a warm start only when it has been confirmed that the configuration of the connected subnets as well as the all-router data are the same as the ones that were used the last time it was started, whereas it does not start up as a router, or moves to a cold start in the other case. This makes it possible to avoid the case where a router starts up in a state where the current network configuration is not reflected in initialization information which the router possessed the last time it was started.

The network system according to the present invention has been described based on the preferred embodiment, but the present invention is not limited to such an embodiment.

More specifically, although each of the routers 10~13 connects two subnets with each other in the present embodiment, such routers may have the function of connecting three or more subnets with one another.

Furthermore, regarding a method for storing Net IDs set by a manual-setting router; not only a method for storing them in an IC, such as memory, but also a method for setting them by use of a DIP switch, or the like, may be employed.

What is claimed is:

1. A network system comprising:
   a plurality of router devices;
   a plurality of sub-networks, each of which connects apparatuses; and
   a Net ID server operable to assign the Net IDs to said plurality of sub-networks,
   wherein said plurality of sub-networks are identified by respective Net IDs, and are connected via said plurality of router devices to form a tree structure, and
   each of said plurality of router devices includes:
      a communication unit operable to connect multiple sub-networks of said plurality of sub-networks;
      a router data storage unit operable to hold router data that includes the respective Net IDs of the multiple sub-networks of said plurality of sub-networks that are connected by said communication unit; and
      a cold start unit operable to perform a cold start, which is a start-up process involving an update of the router data stored in said router data storage unit, operable to cause only router devices located downstream of the router device in which said cold start unit is included to perform a cold start, and operable to cause only router devices located downstream of the router device in which said cold start unit is included to perform a cold start when receiving a request to perform a cold start from another router device of said plurality of router devices located upstream of the router device in which said cold start unit is included, and
   wherein each of said cold start units is further operable to perform the cold start by storing the Net IDs assigned by said Net ID server into each of said router data storage units, respectively, and
   wherein each of said cold start units is further operable to cause each of said plurality of router devices connected to the downstream sub-network of the router device in which said cold start unit is included to perform the cold start by sending a Net ID write request to each of said plurality of router devices connected to the downstream sub-network, the Net ID write request being a request indicating that the Net IDs of the respective downstream sub-networks should be updated to the Net IDs assigned by said Net ID server.

2. The network system according to claim 1,
   wherein each of said cold start units is further operable to perform the cold start by storing pre-set Net IDs into said router data storage unit.

3. The network system according to claim 2,
   wherein each of said cold start units is further operable to cause each of said plurality of router devices connected to the downstream sub-network of the router device with which said cold start unit is included to perform the cold start by sending a Net ID write request to each of said plurality of router devices connected to the downstream sub-network, the Net ID write request being a request indicating that the Net IDs of the respective downstream sub-networks should be updated to the pre-set Net IDs.

4. The network system according to claim 1,
   wherein each of said plurality of router devices further includes an all-router data distribution unit operable to obtain all-router data, which is information made up of router data of each of said plurality of router devices connected to said network system, update the obtained all-router data based on the all-router data and the router data stored in said router data storage unit, and distribute the updated all-router data to each of said plurality of router devices connected to said network system.

5. The network system according to claim 1,
   wherein each of said plurality of router devices further includes a warm start unit operable to perform a warm start, which is a start-up process without involving an update of the router data stored in said router data storage unit.

6. The network system according to claim 5,
   wherein all-router data is stored in said router data storage unit in addition to the router data, the all-router data being information made up of router data of each of said plurality of router devices connected to said network system; and
   each of said warm start units is further operable to perform the warm start when both of the following conditions are satisfied: all information concerning the multiple sub-networks of said plurality of sub-networks connected by said communication unit agrees with the router data stored in said router data storage unit; and all of the all-router data obtained via the multiple sub-networks of said plurality of sub-networks connected by said communication unit agrees with the all-router data stored in said router data storage unit.

7. The network system according to claim 6,
   wherein each warm start unit is further operable to cause a cold start unit to perform the cold start, without performing the warm start, when at least one of the following conditions is satisfied: the information concerning the multiple sub-networks of said plurality of sub-networks connected by said communication unit disagrees with the router data stored in said router data storage unit; and the all-router data obtained via the multiple sub-networks of said plurality of sub-networks connected by said communication unit disagrees with the all-router data stored in said router data storage unit.

8. The network system according to claim 1,
   wherein said Net ID server is connected to an uppermost sub-network of said plurality of sub-networks, and
   wherein each of said cold start units is further operable to determine that said another router device which has sent the request to perform a cold start is located upstream of the router device in which said each of said cold start units is included in a case where said another router device is a master router, a master router being a router device in a subnet to be first provided with router data from the Net ID server.

9. A router device for use in a network system formed of a plurality of router devices, a plurality of sub-networks, each of which connects apparatuses, and a Net ID server connected to an uppermost sub-network, the Net ID server operable to assign Net IDs to the plurality of sub-networks,
wherein the plurality of sub-networks are identified by respective Net IDs, and are connected via the plurality of the router devices to form a tree structure;
said router device comprising:
a communication unit operable to connect multiple sub-networks of the plurality of sub-networks;
a router data storage unit operable to hold router data that includes the respective Net IDs of the multiple sub-networks of the plurality of sub-networks that are connected by said communication unit; and
a cold start unit operable to perform a cold start, which is a start-up process involving an update of the router data stored in said router data storage unit, operable to cause only router devices located downstream of the router device in which said cold start unit is included to perform a cold start, and operable to cause only router devices located downstream of the router device in which said cold start unit is included to perform a cold start when receiving a request to perform a cold start from another router device of said plurality of router devices located upstream of the router device in which said cold start unit is included,
wherein said cold start unit is further operable to perform the cold start by storing the Net IDs assigned by the Net ID server into said router data storage unit, and
wherein said cold start unit is further operable to cause each of said plurality of router devices connected to the downstream sub-network to perform a cold start by sending a Net ID write request to each of said plurality of router devices connected to the downstream sub-network, the Net ID write request being a request indicating that the Net IDs of the respective downstream sub-networks should be updated to the Net IDs assigned by the Net ID server.

10. The router device according to claim 9,
wherein said cold start unit is further operable to perform the cold start by storing pre-set Net IDs into said router data storage unit.

11. The router device according to claim 10,
wherein said cold start unit is operable to cause each of said plurality of router devices connected to the downstream sub-network to perform a cold start by sending a Net ID write request to each of said plurality of router devices connected to the downstream sub-network, the Net ID write request being a request indicating that the Net IDs of the respective downstream sub-networks should be updated to the pre-set Net IDs.

12. The router device according to claim 9, further comprising an all-router data distribution unit operable to obtain all-router data, which is information made up of router data of each of said plurality of router devices connected to the network system, update the obtained all-router data based on the all-router data and the router data stored in said router data storage unit, and distribute the updated all-router data to each of said plurality of router devices connected to the network system.

13. The router device according to claim 9, further comprising a master router detection unit operable to detect a number of master routers connected to all of the multiple sub-networks that are connected by said communication unit, a master router being a router device in a subnet to be first provided with router data from the Net ID server;
wherein said cold start unit is further operable to perform a start-up process, as a router, depending on the number of master routers detected by said master router detection unit.

14. The router device according to claim 13,
wherein said cold start unit is further operable to terminate the start-up process, as a router, when said master router detection unit detects at least two master routers.

15. The router device according to claim 13,
wherein said cold start unit is further operable to terminate the start-up process, as a router, when said master router detection unit does not detect any master routers.

16. The router device according to claim 13,
wherein the network system further includes a Net ID server for assigning Net IDs to the plurality of sub-networks; and
said cold start unit, when said master router detection unit detects one master router, is further operable to determine whether it is possible to communicate with the Net ID server, and to perform the start-up process as a router, depending on a result of the determination.

17. The router device according to claim 9, further comprising a warm start unit operable to perform a warm start, which is a start-up process without involving an update of the router data stored in said router data storage unit.

18. The router device according to claim 17, further comprising a master router detection unit operable to detect a number of master routers connected to all the multiple sub-networks of the plurality of sub-networks that are connected by said communication unit, a master router being a router device in a subnet to be first provided with router data from the Net ID server;
wherein said warm start unit is further operable to perform a start-up process, as a router, depending on the number of master routers detected by said master router detection unit.

19. The router device according to claim 18,
wherein said warm start unit is further operable to terminate the start-up process, as a router, when said master router detection unit detects at least two master routers.

20. The router device according to claim 18,
wherein said warm start unit is further operable to:
determine whether or not information concerning the multiple sub-networks of the plurality of sub-networks connected by said communication unit agrees with the router data stored in said router data storage unit, when said master router detection unit does not detect any master routers;
when the information concerning the multiple sub-networks of the plurality of sub-networks connected by said communication unit agrees with the router data stored in said router data storage unit,
determine whether said router device is an automatic-setting router, which is a router capable of storing, into said router data storage unit, a Net ID that is assigned from a Net ID server that is connected to the network system, or a manual-setting router, which is a router capable of holding a pre-set Net ID in said router data storage unit; and
cause the cold start unit to perform the cold start, without performing the warm start, when said router device is an automatic-setting router, and perform a warm start when said router device is a manual-setting router.

21. The router device according to claim 18, wherein said warm start unit, when said master router detection unit does not detect any master routers, is operable to determine whether or not information concerning the multiple sub-networks of the plurality of sub-networks connected by said communication unit agrees with the router data stored in said router data storage unit, and to cause the cold start unit to perform the cold start, without performing the warm start, when the information concerning the multiple sub-networks of the plurality of sub-networks connected by said communication unit disagrees with the router data stored in said router data storage unit.

22. The router device according to claim 18, wherein said warm start unit is further operable to:
determine whether or not the information concerning the multiple sub-networks of the plurality of sub-networks connected by said communication unit agrees with the router data stored in said router data storage unit, when said master router detection unit detects one master router;
when the information concerning the multiple sub-networks of the plurality of sub-networks connected by said communication unit agrees with the router data stored in said router data storage unit, obtain all-router data, which is information made up of router data of each of said plurality of router devices connected to the network system, and determine whether or not the obtained all-router data agrees with all-router data stored in said router data storage unit; and
perform a warm start when the obtained all-router data and the all-router data stored in said router data storage unit agree with each other, and cause said cold start unit to perform the cold start, without performing the warm start, when the obtained all-router data and the all-router data stored in said router data storage unit disagree with each other.

23. The router device according to claim 18, wherein said warm start unit is further operable to, when said master router detection unit detects one master router, determine whether or not information concerning the multiple sub-networks of the plurality of sub-networks connected by said communication unit agrees with the router data stored in said router data storage unit, and to cause said cold start unit to perform the cold start, without performing the warm start, when the information concerning the multiple sub-networks of the plurality of sub-networks connected by said communication unit disagrees with the router data stored in said router data storage unit.

24. A start-up method for starting up a router device in a network system formed of a plurality of router devices, a plurality of sub-networks, each of which connects apparatuses, and a Net ID server connected to an uppermost sub-network, the Net ID server operable to assign Net IDs to the plurality of sub-networks,
wherein the plurality of sub-networks are identified by respective Net IDs, and are connected via a plurality of the router devices to form a tree structure; and
each router device includes:
a communication unit operable to connect multiple sub-networks of the plurality of sub-networks;
a router data storage unit operable to hold router data that includes the respective Net IDs of the multiple sub-networks of the plurality of sub-networks that are connected by the communication unit; and
a cold start unit operable to perform a cold start, which is a start-up process involving an update of the router data stored in said router data storage unit, operable to cause only router devices located downstream of the router device in which said cold start unit is included to perform a cold start, and operable to cause only router devices located downstream of the router device in which said cold start unit is included to perform a cold start when receiving a request to perform a cold start from another router device of said plurality of router devices located upstream of the router device in which said cold start unit is included;
said start-up method comprising:
a cold start step of performing a cold start; and
causing each of the plurality of router devices connected to a downstream sub-network to perform a cold start,
wherein in said cold start step, the cold start is performed by storing the Net IDs assigned by the Net ID server into said router data storage unit, and
wherein in said cold start step, said router performs the cold start by sending a Net ID write request to each of the plurality of router devices connected to the downstream sub-network, the Net ID write request being a request indicating that the Net IDs of the respective downstream sub-networks should be updated to the Net IDs assigned by the Net ID server.

25. A program stored in a computer-readable medium for a router device in a network system formed of a plurality of sub-networks, each of which connects apparatuses, said program stored in a computer-readable medium comprising a computer executable code operable to cause a computer to execute the start-up method according to claim 24.

* * * * *